United States Patent
Rhynard et al.

(10) Patent No.: US 12,187,406 B2
(45) Date of Patent: Jan. 7, 2025

(54) MULTI-PIECE BULKHEAD ASSEMBLY FOR HIGH-WALLED CABIN SUITE

(71) Applicant: The Boeing Company, Chicago, IL (US)

(72) Inventors: Steven Ellis Rhynard, Mukilteo, WA (US); Joe Files, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/582,478

(22) Filed: Jan. 24, 2022

(65) Prior Publication Data
US 2023/0234695 A1 Jul. 27, 2023

(51) Int. Cl.
*B64C 1/10* (2006.01)
*B64D 11/00* (2006.01)

(52) U.S. Cl.
CPC .......... *B64C 1/10* (2013.01); *B64D 11/0023* (2013.01)

(58) Field of Classification Search
CPC ........ B64D 11/0023; B64D 2011/0046; B64C 1/066
See application file for complete search history.

(56) References Cited

U.S. PATENT DOCUMENTS

| | | | | |
|---|---|---|---|---|
| 5,165,626 | A * | 11/1992 | Ringger | B64D 11/0023 160/231.1 |
| 2006/0032155 | A1* | 2/2006 | Thomassin | B64D 11/0023 52/36.2 |
| 2009/0321574 | A1* | 12/2009 | Erickson | F16B 21/06 29/525.01 |
| 2016/0347436 | A1* | 12/2016 | Doran | B64D 11/003 |
| 2017/0152043 | A1* | 6/2017 | Schaefer | B64D 11/0698 |
| 2018/0022457 | A1* | 1/2018 | Papke | B64D 11/0023 244/118.6 |
| 2019/0217938 | A1* | 7/2019 | Cysewski | B64C 1/20 |
| 2020/0362595 | A1* | 11/2020 | Files | E05F 3/20 |

* cited by examiner

*Primary Examiner* — Richard Green
*Assistant Examiner* — Colin Zohoori
(74) *Attorney, Agent, or Firm* — Joseph M. Butscher; The Small Patent Law Group LLC

(57) ABSTRACT

A bulkhead assembly for an aircraft passenger cabin having a floor and a secondary support member includes upper and lower bulkhead panels and a bulkhead coupling member. The upper bulkhead panel defines an elongated tower portion that protrudes through a slot opening in an overhead closeout panel, and directly or indirectly connects to the secondary support member. The lower bulkhead panel connects to the upper bulkhead panel and to the floor via the bulkhead coupling member. A method for installing the bulkhead assembly in the passenger cabin includes connecting the lower bulkhead panel to the floor, joining the lower bulkhead panel to the base of the upper bulkhead panel using a bulkhead coupling member, inserting the terminal end through the slot opening, and connecting the terminal end to the secondary support member behind the overhead closeout panel.

21 Claims, 6 Drawing Sheets

MULTI-PIECE BULKHEAD ASSEMBLY FOR HIGH-WALLED CABIN SUITE

BACKGROUND

The present disclosure relates to an improved bulkhead construction for use aboard a host aircraft, as well as to associated methods for constructing and integrating such a bulkhead into a passenger cabin of the host aircraft.

An aircraft bulkhead is a relatively thin wall-like partition commonly used to divide a passenger cabin or another interior space of a host aircraft into different sections. Depending on the construction and end use of the host aircraft, a given bulkhead may be arranged to separate rows of seats from an adjacent lavatory or galley area, or the bulkhead may form a clear demarcation between adjacent seating classes, e.g., by dividing a first class seating section at the front of the passenger cabin from an aft business class section. Bulkheads may also be used in certain aircraft to construct high-walled suites, typically along an outboard wall of the passenger cabin, with such high-walled suites enabling passengers seated therein to enjoy a higher degree of privacy relative to the customarily available in-cabin seating options.

As appreciated in the art, a passenger support unit (PSU) of the type used aboard a typical passenger aircraft contains, among other things, an extended network of electrical wiring and associated connectors suitable for supplying low-voltage electrical power to a myriad of systems, including overhead reading lights, audio speakers, warning lamps, and informational signage. PSU hardware also includes flexible hoses, valves, and regulators for circulating air to overhead air condition vents, and for supplying emergency oxygen to deployed oxygen masks when needed. Closeout panels are used to hide the PSU hardware from view, with the closeout panel blending into adjacent overhead storage bins ("stow bins"), as well as to blend seamlessly into areas of the host aircraft lacking such stow bins.

SUMMARY

A multi-piece bulkhead assembly as described in detail herein is configured to facilitate aircraft assembly and installation efforts, in particular when installing the bulkhead assembly within a passenger cabin or another interior space of a host aircraft having a run of overhead storage bins ("stow bins") and/or a closeout panel, e.g., a passenger service unit (PSU) closeout panel or a stow bin closeout panel. The labyrinthine collection of electrical and pneumatic hardware contained behind a PSU closeout panel as summarized above can complicate the aircraft assembly process, and in particular the installation of high-walled bulkheads in a passenger cabin. The multi-piece construction of the present bulkhead assembly minimizes disruption of the various electromechanical systems housed behind the closeout panels, while also minimizing the number and extent of required modifications to the aircraft. Use of the described bulkhead assembly also facilitates installation of outboard compartments when utilizing the installed bulkhead assembly as a common or shared wall, with high-walled private passenger suites being just one possible end use of the outboard compartment.

Within the scope of the present disclosure, the bulkhead assembly includes complementary upper and lower bulkhead panels. As used herein, the terms "upper" and "lower" refer to the relative positions of the bulkhead panels with respect to a normal upright orientation of the host aircraft, i.e., with "lower" being closer to the floor of the passenger cabin and "upper" being closer to the ceiling. The lower bulkhead panel is connected to a floor of the passenger cabin, with the upper bulkhead panel being coupled to a secondary support member of the aircraft located above and behind the aforementioned stow bins and closeout panels. The upper and lower bulkhead panels are interconnected via a bulkhead coupling member to complete the construction of the bulkhead assembly, with the upper bulkhead panel possibly contoured to follow or match a profile of the closeout panel or the ceiling in different constructions. While the particular order of installation may vary based on the geometry of the aircraft, it may be advantageous to install the lower bulkhead panel first, followed by connection of the upper bulkhead panel.

The upper bulkhead panel includes an elongated extension or "tower" portion, which is hereinafter referred to as a tower for simplicity. The tower is configured to pass unobtrusively through a relatively small slot opening provided in the overhead closeout panel. The tower, which may broaden out and thereafter follow a contour of the overhead closeout panel or a ceiling of the passenger cabin in some embodiments, is securely attached to the secondary support member in a manner that ensures any incident loads on the installed bulkhead assembly are ultimately transferred to the secondary support member. The tower as contemplated herein is easily guided through or around the existing PSU systems located behind the closeout panel. As a result, the bulkhead assembly may be installed without extensive modification of the aircraft or its existing PSU systems, as noted above.

With respect to the aircraft, implementation of the present teachings involves making two fundamental structural modifications: (1) formation of the slot opening in the closeout panel, with the slot opening being sized and placed to accommodate the relatively narrow width of the tower, and (2) formation of a small clevis opening in a "strong back" structure used aboard typical passenger aircraft to securely mount the overhead stow bins. The upper bulkhead panel is connected to the secondary support member through the clevis opening using a tie rod and clevis fastener or other suitable mounting hardware. Once installed in this manner, the bulkhead assembly may be trimmed out using décor panels or trim features as desired to hide a split line or interface between the upper and lower bulkhead panels, and to thereby present a finished cosmetic appearance.

A representative embodiment of the present multi-piece bulkhead assembly, which itself is usable with or as an integral part of a high-walled cabin suite of an aircraft having the above-noted secondary support member, includes the upper and lower bulkhead panels and bulkhead coupling member. The upper bulkhead panel defines the tower. As summarized above, the tower is configured to protrude through the slot opening in the overhead closeout panel. The tower ultimately connects to the secondary support member, e.g., using a clevis fastener protruding through the above-noted clevis opening and a tie-rod or one or more other intervening structural connection member(s). The lower bulkhead panel for its part connects to the floor and upper bulkhead panel to thereby form the bulkhead assembly as an integrated unit.

The bulkhead coupling member is configured to connect the upper and lower bulkhead panels before or after the upper bulkhead panel has been securely coupled to the secondary support member. The bulkhead coupling member in some embodiments may optionally include an elongated groove and a mating tongue as integral structure of the upper and lower bulkhead panels, such that the upper and lower bulkhead panels are securely interconnected at least in part using a tongue-and-groove connection.

The bulkhead coupling member may alternatively include a pair of splice plates and a plurality of fasteners, e.g., bolts or rivets, in which case the upper and lower bulkhead panels are joined together via the splice plates and fasteners. In such a configuration, a trim panel may be operatively connected to the upper and lower bulkhead panels in a position that covers a horizontal split line between the connected upper and lower bulkhead panels, the splice plates, and the fasteners.

An aspect of the disclosure includes a tie rod configured to connect the tower to the secondary support member. The tower in a possible embodiment includes a terminal end configured to engage with a distal end of the tie rod. The terminal end of tower may include parallel mounting plates defining a groove therebetween, with the groove being configured to receive the distal end of the tie rod therein, e.g., using an additional clevis fastener.

In a possible construction of the bulkhead assembly, the lower bulkhead panel defines a pocket. The upper bulkhead panel in such an embodiment may be positioned at least partially within the pocket of the lower bulkhead panel. A width of the upper bulkhead panel at a base thereof, i.e., a widest portion of the upper bulkhead panel located closest to the lower bulkhead panel, may be more than half of a corresponding width of the elongated tower. For example, a width of the tower may be about 25% to 40% of the width of the base, with "about" as used in this instance meaning "within ±5% of the stated exemplary values."

A lateral edge of the lower bulkhead panel may be optionally configured to engage with a doorframe within the passenger cabin. In this or other embodiments, a profile of the upper bulkhead panel may be contoured to follow or match the overhead closeout panel, i.e., a perimeter edge of the upper bulkhead panel, at a portion thereof that broadens out from the tower toward the base, may be shaped to match a surface profile of the overhead closeout panel, or possibly the ceiling.

The exemplary passenger cabin described herein may include adjacent high-walled cabin suites in a possible configuration as noted above. The bulkhead assembly of the present disclosure may be used to separate the adjacent high-walled cabin suites from each other as a shared bulkhead, i.e., as a common wall. When the perimeter edge of the upper bulkhead panel matches a surface profile of the ceiling as noted above, the shared bulkhead may completely close off the adjacent cabin suites.

Also disclosed herein is a method for installing the above-summarized bulkhead assembly within a passenger cabin of an aircraft, with the aircraft having an overhead closeout panel and a secondary support member. The method according to an exemplary embodiment includes inserting a terminal end of the tower of the upper bulkhead panel through the slot opening in the overhead closeout panel, such that the terminal end protrudes through the slot opening. The upper bulkhead panel in this particular embodiment has a base that tapers into the tower, and vice versa, such that a width of the tower is less than half of a width of the base, e.g., the width of the tower is about 25% to 40% of the width of the base in some embodiments.

The method also includes connecting the terminal end of the tower to the secondary support member behind the overhead closeout panel, such that the upper bulkhead panel is ultimately suspended from the secondary support member. Additionally, the method includes joining the lower bulkhead panel to the base using the bulkhead coupling member. This action occurs before connecting the upper bulkhead panel to the secondary support member in some embodiments. The lower bulkhead panel is securely connected to a floor of the passenger cabin.

In some implementations of the present method, connecting the terminal end of the tower to the secondary support member includes positioning a distal end of a tie rod within a groove formed between parallel end plates, and thereafter connecting the distal end of the tie rod to the terminal end of the upper bulkhead panel using the parallel end plates.

As summarized above, the lower bulkhead panel may optionally define a pocket, in which case the act of joining the lower bulkhead panel to the base of the upper bulkhead panel may include positioning the base of the upper bulkhead panel at least partially within the pocket.

Joining the lower bulkhead panel to the base may also include sliding a mating tongue of the lower bulkhead panel into an elongated groove of the upper bulkhead panel to thereby interconnect the upper and lower bulkhead panels via a tongue-and-groove connection, such that the bulkhead coupling member includes the mating tongue and the elongated groove.

In a possible embodiment of the method, joining the lower bulkhead panel to the base of the upper bulkhead panel includes joining the lower bulkhead panel to the upper bulkhead panel using a pair of splice plates and a plurality of fasteners, with the bulkhead coupling member including the splice plates and fasteners.

The method may also include attaching a trim panel to the upper and lower bulkhead panels to cover the splice plates and fasteners.

In yet another embodiment, the method may include engaging a lateral edge of the lower bulkhead panel with a doorframe within the passenger cabin to form a wall of a high-walled cabin suite.

Another aspect of the disclosure includes a high-walled cabin suite for an aircraft. The aircraft has an overhead closeout panel connected to a secondary support member, either directly or indirectly. The high-walled cabin suite in a possible embodiment includes a floor, a doorframe connected to the floor, a door connected to the doorframe, a tie rod, and a bulkhead assembly. The bulkhead assembly, which is connected to the secondary support member and to the floor, includes an upper bulkhead panel having a base and a tower. The tower tapers into the base, and a perimeter edge of the upper bulkhead panel is contoured to match a profile of the overhead closeout panel. A terminal end of the tower protrudes through a slot opening in the overhead closeout panel and connects to the secondary support member via the tie rod. A width of the base of the upper bulkhead panel in this embodiment is more than twice a width of the tower, i.e., with the tower widening into the base.

The high-walled cabin suite also includes a bulkhead coupling member and a lower bulkhead panel. The lower bulkhead panel is connected to the floor and to the upper bulkhead panel, with the connection to the upper bulkhead panel being accomplished via the bulkhead coupling member.

The bulkhead coupling member in an exemplary embodiment may include a pair of splice plates, a plurality of fasteners, and a trim panel operatively connected to upper and lower bulkhead panels. The trim panel covers the splice plates and the fasteners to present an aesthetically finished appearance.

The above summary is not intended to represent every possible embodiment or every aspect of the present disclosure. The above-summarized features and advantages, and other features and advantages of the present disclosure, will be readily apparent from the following detailed description of representative embodiments and modes for carrying out the present disclosure when taken in connection with the accompanying drawings and the appended claims.

DETAILED DESCRIPTION

Numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters, e.g., to within ±10 percent of a stated value. In addition, disclosure of ranges includes disclosure of all values and further divided ranges within the entire range. Values within a given specified range and the endpoints of a range are hereby disclosed as a separate embodiment.

Figure 1:
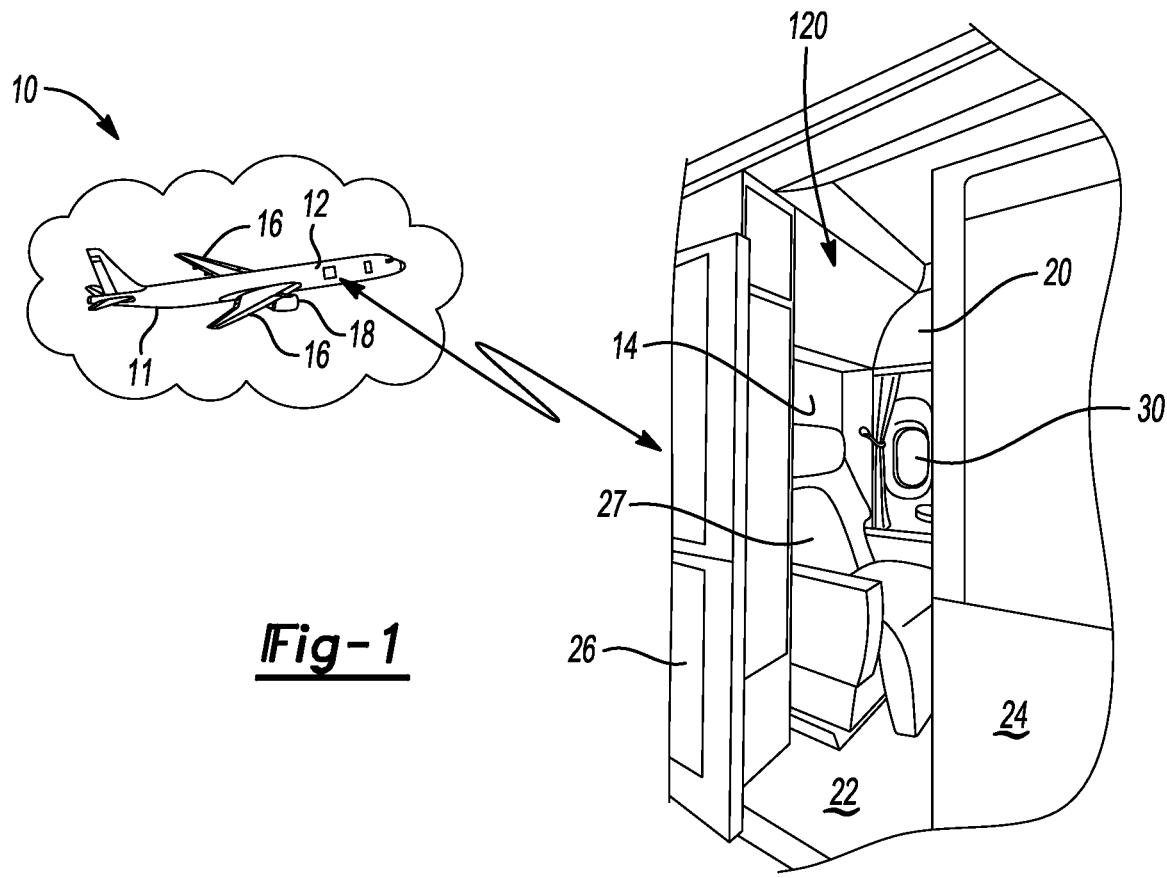
FIG. 1 is a perspective view illustration of a representative passenger cabin utilizing a multi-piece bulkhead assembly constructed and installed as set forth herein.

Referring to the drawings, wherein like reference numbers refer to the same or like components in the several Figures, and beginning with FIG. 1, an aircraft 10 includes a fuselage 11 and an aircraft interior 12. The aircraft interior 12 is constructed in part from a multi-piece bulkhead assembly 14, with the bulkhead assembly 14 in turn configured and constructed as set forth in detail below with reference to FIGS. 2-9. Attendant benefits of the disclosed bulkhead assembly 14 include an improved ease of integration of the bulkhead assembly 14 with the aircraft interior 12, along with a substantial minimization of required structural modifications to the aircraft 10, e.g., when integrating the bulkhead assembly 14 into a high-walled cabin suite 120.

In an exemplary configuration of the aircraft 10 of FIG. 1, the fuselage 11 is connected to wings 16 such that the aircraft 10 embodies a fixed-wing passenger or cargo airplane. Propulsors 18 are attached to the fuselage 11 and/or the wings 16, with the propulsors 18 possibly including turbine engines or propellers in the illustrated fixed-wing use case of FIG. 1. Other embodiments of the aircraft 10 may be envisioned within the scope of the present disclosure, including helicopters, tilt-rotors, or other vertical takeoff and landing (VTOL) aircraft, and therefore the present teachings may be extended to a wide range of aircraft and other land and surface or subsurface marine vehicles, without limitation.

The bulkhead assembly 14 described herein may be used as a solid partition wall of the aircraft interior 12, e.g., of the high-walled cabin suite 120 in a representative configuration. As appreciated by those skilled in the art, a typical passenger compartment includes runs of overhead storage bins ("stow bins") for securely stowing carry-on luggage or personal effects while the aircraft 10 is in operation. The stow bins may not be present in all areas of the aircraft interior 12, in which case continuity with the stow bins is provided via overhead closeout panels 20. The overhead closeout panels 20 likewise hide passenger support units (PSUs) (not shown) from view as described above.

The high-walled cabin suite 120 in a possible configuration includes a floor 22, a doorframe 24 connected to the floor 22, and a door 26 connected to the doorframe 24. The door 26 in a particular configuration may slide toward and away from the doorframe 24 for more or less privacy, as desired. A representative embodiment of the high-walled cabin suite 120 may include, e.g., a passenger seat 27 positioned adjacent a window 30, and possibly other amenities such as a refrigerator, infotainment system, etc. The high-walled cabin suite 120 may have other uses in different embodiments, e.g., as a storage closet or a cargo containment area, and therefore potential uses of the bulkhead assembly 14 of the present disclosure are not limited to the representative embodiment of FIG. 1.

Figure 2:
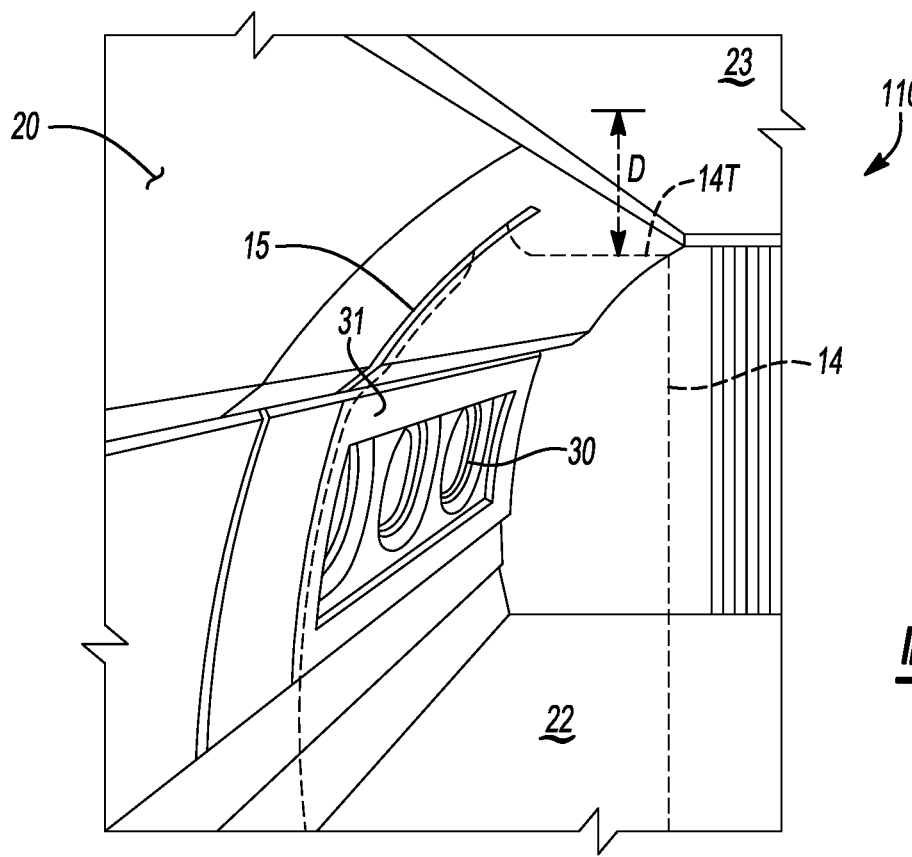
FIG. 2 is a perspective view illustration of a run of overhead closeout panels configured to receive a portion of an upper bulkhead panel of the bulkhead assembly of the present disclosure.

Referring briefly to FIG. 2, the fuselage 11 of the exemplary fixed-wing embodiment of FIG. 1 and other possible embodiments defines the aircraft interior 12. Passenger seats and other structure have been omitted from FIG. 2 for illustrative clarity. From the perspective of FIG. 2, the windows 30 are shown arranged along an outboard wall 31 just below the above-described overhead closeout panels 20. As part of its construction, the bulkhead assembly 14 is assembled from separate bulkhead panels, hereinafter referred to as an upper bulkhead panel 14U and a lower bulkhead panel 14L, which are best illustrated in FIG. 4.

Figure 4:
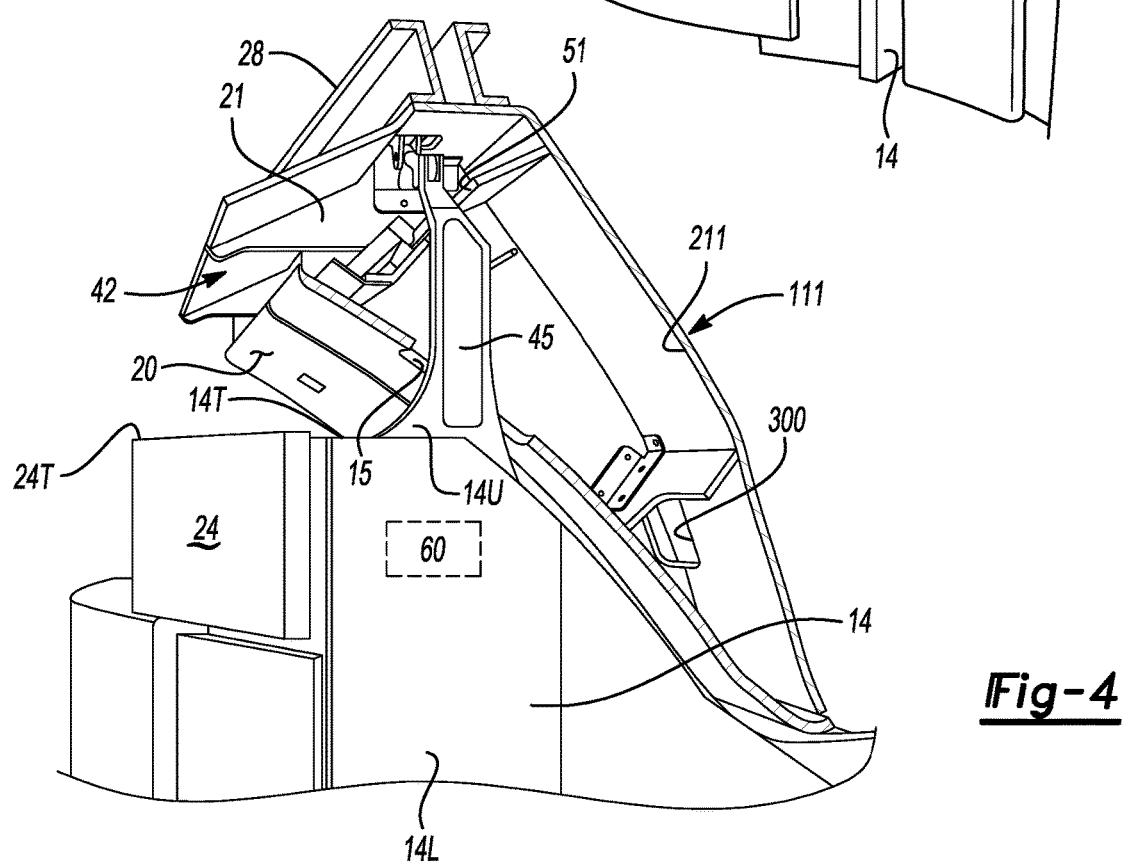
FIG. 4 is a partial cross-sectional perspective view illustration of the bulkhead assembly and a closeout panel in accordance with the present disclosure.

The overhead closeout panels 20 shown in FIG. 2 define a slot opening 15 through which a portion of the bulkhead assembly 14 is inserted and ultimately connected to a secondary support member 28 of the aircraft 10, with a portion of the secondary support member 28 being depicted in FIG. 4. Once the bulkhead assembly 14 has been properly installed, a top edge 14T of the bulkhead assembly 14 remains spaced apart from a ceiling 23 of the aircraft interior 12 by a distance D. Using a non-limiting exemplary cabin height of 215 cm-220 cm, for instance, the distance D may be about 25 cm-35 cm, thus allowing the bulkhead assembly 14 to be used in the construction of the high-walled cabin suite 120 of FIG. 1 to provide a high degree of privacy relative to typical in-cabin seating options, either stopping short of the ceiling 23 or extending up the ceiling 23.

Figure 3:
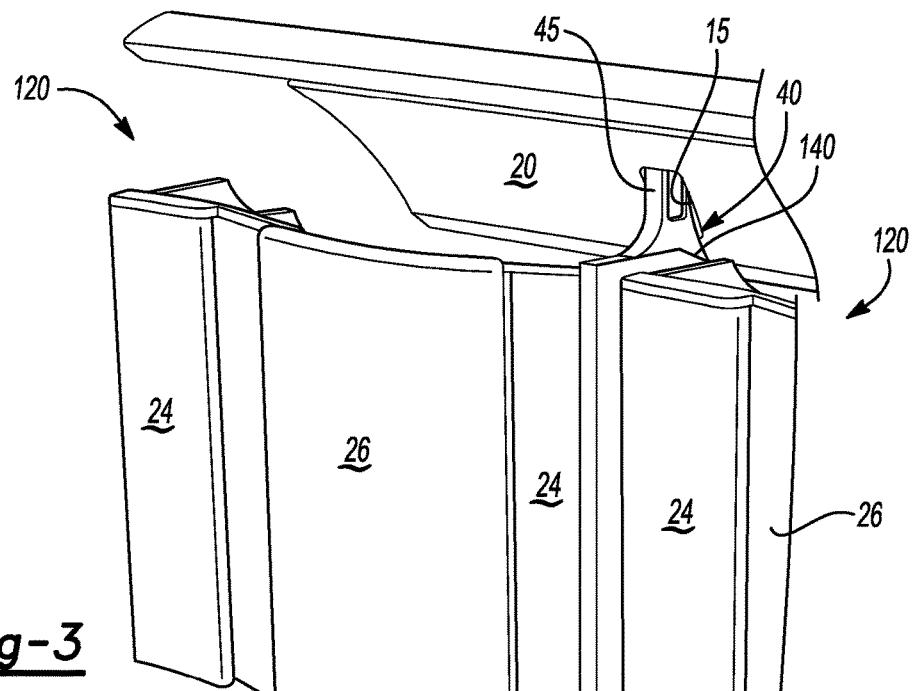
FIG. 3 is a perspective view illustration of a high-walled cabin suite utilizing the bulkhead assembly according to a representative embodiment.

FIG. 3 illustrates a possible use of the bulkhead assembly 14 described above when constructing adjacent/side-by-side high-walled cabin suites 120. The bulkhead assembly 14 includes an elongated tower portion, hereinafter referred to as a tower 45, which protrudes into and through the slot opening 15 in the overhead closeout panel 20 as set forth in detail below with reference to FIGS. 4-5. A perimeter edge 40 of the tower 45 broadens out upon exiting the overhead closeout panel 20, and thereafter is contoured to follow or match the profile of the overhead closeout panel 20, or possibly the ceiling 23. The bulkhead assembly 14 in such a use case effectively separates the high-walled cabin suites 120 from each other, and thereby acts as a shared bulkhead 140, i.e., forming a solid partition wall used in common by the adjacent high-walled cabin suites 120. Each of the high-walled cabin suites 120 may include its own respective door 26 and doorframe 24 as depicted, with the construction and operation of the door 26 varying with the intended application. For instance, the doors 26 may slide, hinge, or fold in different embodiments, or the doors 26 may be made of a flexible fabric material. The representative construction of FIG. 3 is therefore representative and non-limiting.

Referring to FIG. 4, an aircraft such as the representative aircraft 10 of FIG. 1 includes the secondary support structure 28 for mounting the various cabin equipment to the longitudinal frame rails and lateral ribs (not shown) of the fuselage 11. The secondary support structure 28 typically includes, e.g., a longitudinal rail or beam arranged as shown, to which the stow bins (not shown) and the overhead closeout panels 20 are securely connected, typically via structure referred to in the art as a strong back 21.

As noted briefly above, in some embodiments the perimeter edge 40 of the bulkhead assembly 14 upon exiting from the slot opening 15 is contoured to match or follow a surface profile of the overhead closeout panel 20 along mutually interfacing surfaces. That is, the perimeter edge 40 may be shaped to match a surface curvature of the overhead closeout panel 20 along such interfacing surfaces, in particular where the bulkhead assembly 14 passes through the overhead closeout panel 20 through the slot opening 15. In this manner, the bulkhead assembly 14 when installed appears to seamlessly extend from the overhead closeout panel 20.

Installation of the bulkhead assembly 14 shown in FIG. 4 is enabled by its multi-piece construction as described herein, which in turn facilitates connection to the secondary support member 28. A top edge 24T of the doorframe 24 may be arranged flush with a top edge 14T (also see FIG. 4A) of the bulkhead assembly 14. Also visible from the perspective of FIG. 4 is a fuselage skin 111 and fuselage wall 211, with a window opening 300 formed therethrough. The overhead closeout panel 20 is depicted as it would appear in an installed state, i.e., securely mounted to the strong back 21 as appreciated in the art. In such an installed state, the above-noted slot opening 15 provides access to a work area 42 located aft of/behind the overhead closeout panel 20. As described below with particular reference to FIG. 6, the described configuration of the bulkhead assembly 14 allows an operator to access the work area 42 as needed, e.g., when fastening the tower 45 of the bulkhead assembly 14 to the secondary support member 28, and when inserting the tower 45 through a clevis opening 51 in the strong back 21 as noted below.

To that end, the bulkhead assembly 14 according to an exemplary embodiment includes the respective upper and lower bulkhead panels 14U and 14L, along with a bulkhead coupling member 60, the latter being depicted schematically in FIG. 4 and shown in more detail in various embodiments in FIGS. 4A and 7A-9. Although omitted for simplicity, the respective upper and lower bulkhead panels 14U and 14L may also be equipped or embedded with vertical support beams to account for expected structural loads, e.g., when constructing the representative high-walled cabin suites 120 of FIGS. 1 and 2 in which furniture or other items may be bolted to and supported by the bulkhead assembly 14.

The bulkhead coupling member 60 for its part connects the upper bulkhead panel 14U to the lower bulkhead panel 14L. The bulkhead coupling member 60 may be installed before connecting the upper bulkhead panel 14U to the secondary support member 28 to facilitate handling and installation efforts, or after in some implementations. In its various alternative configurations as described below, the bulkhead coupling member 60 may also provide the bulkhead assembly 14 with a cosmetically appealing and finished appearance. For instance, the size, shape, contour, and appearance of the bulkhead coupling member 60 may cover any unsightly seams or gaps between the respective upper and lower bulkhead panels 14U and 14L, with the bulkhead assembly 14 ultimately having the appearance of a unitary or complementary piece.

Figure 4A:
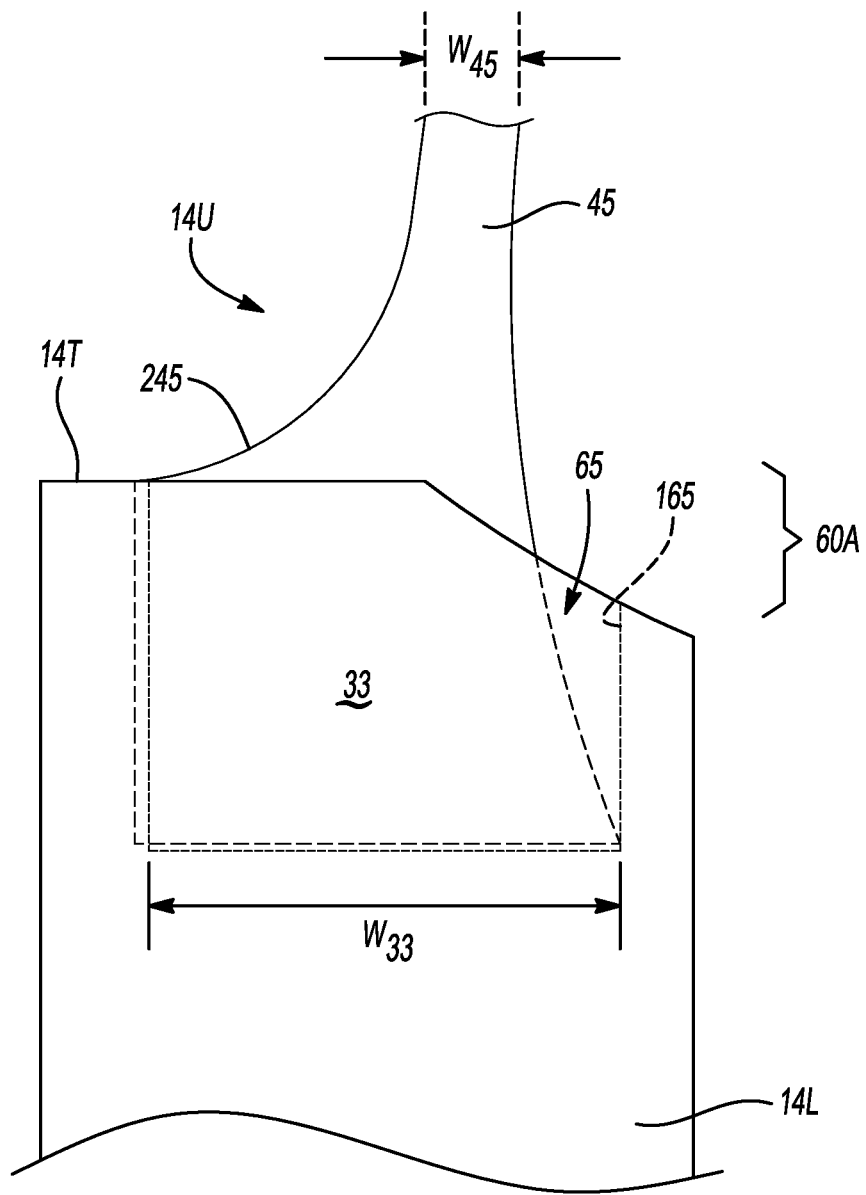
FIG. 4A is a plan view illustration of a possible connection of the upper and lower bulkhead panels.

Referring briefly to FIG. 4A, a base 33 of the upper bulkhead panel 14U, itself the widest portion of the upper bulkhead panel 14U located closest to the lower bulkhead panel 14L, has a width W33 that exceeds a corresponding width W45 of the tower 45 by at least two times. In an exemplary construction, the width W43 of the tower 43 may be between about 25 percent and 50 percent of the width W33 of the base 33. Tapering may be achieved by forming lateral edges 245 of the tower 45 with a radius of curvature sufficient for allowing the tower 45 to smoothly arc toward and enter the slot opening 15 of FIGS. 2-4. The lower bulkhead panel 14L in turn is configured to connect to the upper bulkhead panel 14U and to the floor 22 (see FIGS. 1 and 2) to thereby form the bulkhead assembly 14.

To facilitate secure connection of the lower bulkhead panel 14L to the upper bulkhead panel 14U, the bulkhead coupling member 60 of FIG. 4 may be embodied as a bulkhead coupling member 60A. The lower bulkhead panel 14L in some configurations may include inner walls 165 defining a pocket 65 in the lower bulkhead panel 14L. In this exemplary construction, the upper bulkhead panel 14U is positioned at least partially within the pocket 65, possibly using an interference fit so as to temporarily secure the upper and lower bulkhead panels 14U and 14L and thereby facilitate final assembly. The bulkhead coupling member 60A is thus formed by the mating fit of the upper bulkhead panel 14U and the lower bulkhead panel 14L within the pocket 65. Connection of the lower bulkhead panel 14L to the floor 22 of FIGS. 1 and 2 may be achieved using existing floor rails (not shown), i.e., of the type commonly used to secure passenger seats and cargo pallets to the floor 22.

Figure 5:
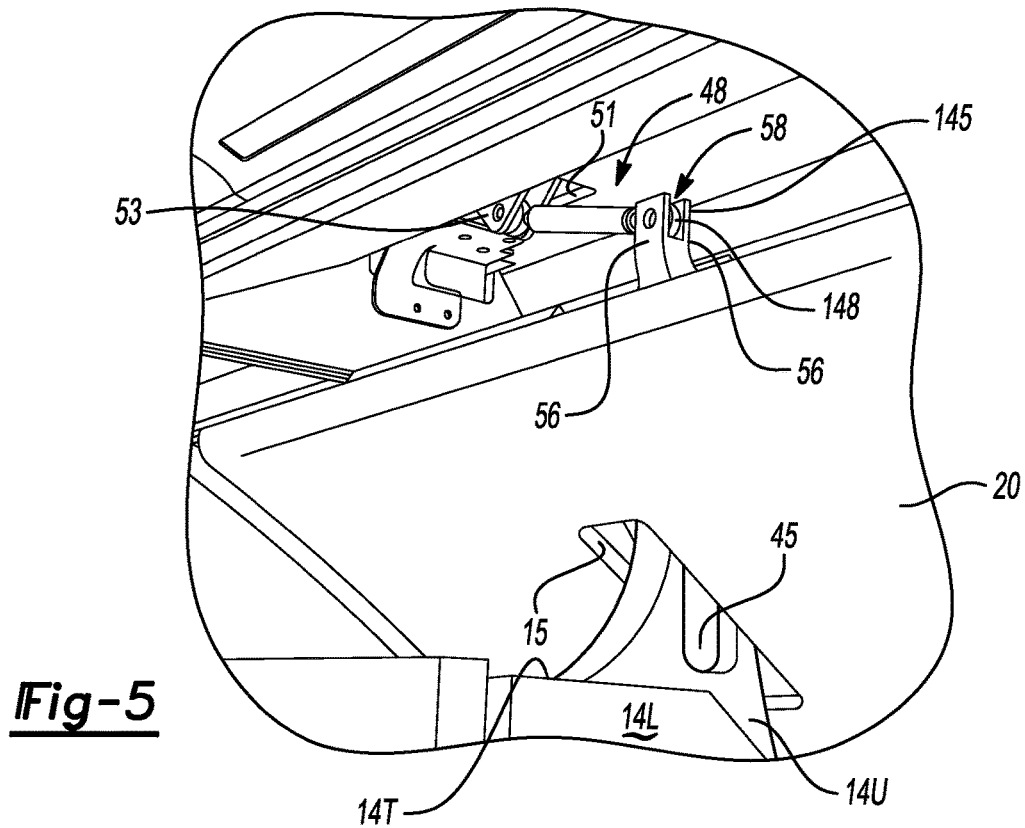
FIG. 5 is a perspective view illustration of the upper bulkhead panel and a tie-rod connection in accordance with an aspect of the disclosure.

As best shown in FIG. 5, secure connection of the tower 45 to the secondary support member 28 visible in FIG. 4, after first inserting the tower 45 through the slot opening 15, may be achieved using a tie rod 48 in some implementations of the present teachings. For instance, a clevis fastener 53 may be used to connect the tie rod 48 to the secondary support member 28, with the clevis fastener 53 protruding through the clevis opening 51 in the strong back 21 as shown.

The tower 45 of the upper bulkhead panel 14U includes a terminal end 145 that is configured to engage with a distal end 148 of the tie rod 48. By way of an example, the terminal end 145 of the tower 45 may include parallel mounting plates 56 defining a groove 58 therebetween, with the groove 58 in this instance being configured to receive the distal end 148 of the tie rod 48 therein. Connection of the tower 45 to the secondary support member 28 may be implemented using other hardware not specifically shown or described herein, and therefore the exemplary tie rod 48 of FIG. 5 is just one possible solution.

Figure 6:
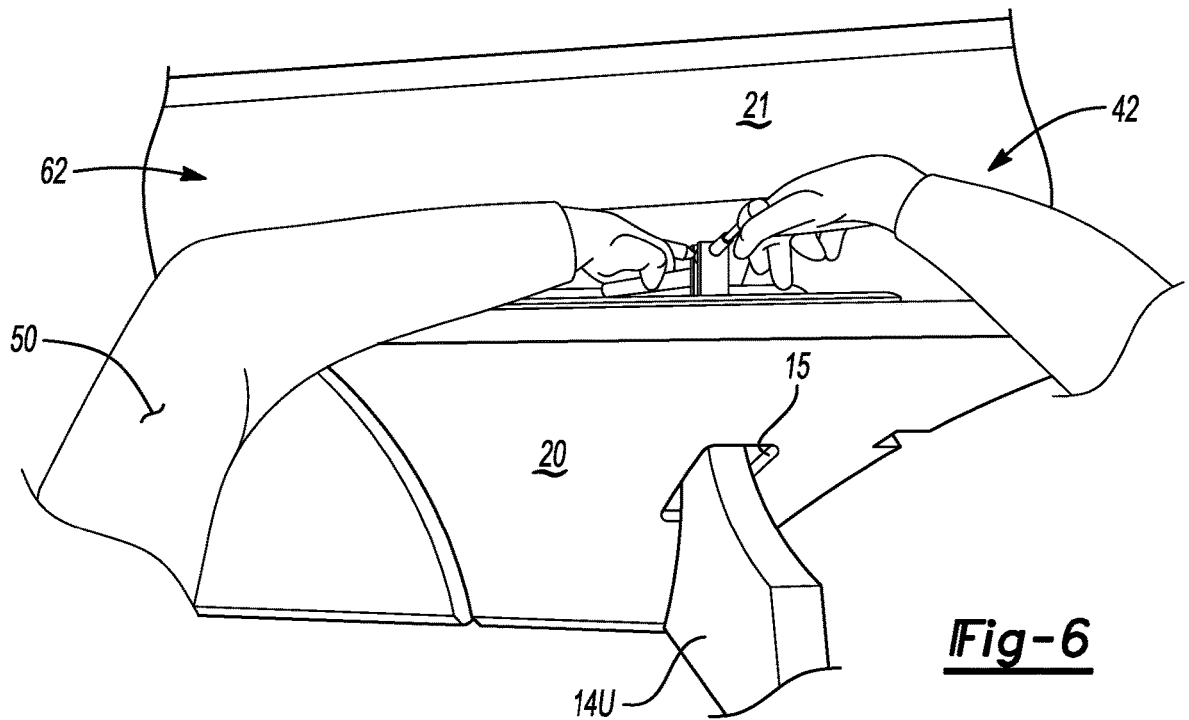
FIG. 6 is a perspective view illustrations of a representative installation process during which an operator attaches the upper bulkhead panel through a slot opening in an overhead closeout panel, and thereafter connects the upper bulkhead panel to a secondary support member, e.g., of the aircraft shown in FIG. 1.

Referring now to FIG. 6, installation of the bulkhead assembly 14 of FIGS. 1 and 2 is facilitated by its multi-piece construction and associated modifications to the overhead closeout panel 20. The work area 42 is accessed by an operator 50 through a gap 62 between the overhead closeout panel 20 and the ceiling 23 (see FIG. 2) of the aircraft interior 12. Thus, during assembly of the aircraft 10 the operator 50 is able to reach through the gap 62 into the work area 42 to access the terminal end 145 of the tower 45, and the distal end 148 of the tie rod 48, as best shown in FIG. 5. The height of the gap 62 above the floor 22 of FIGS. 1 and 2 would likely entail use by the operator 50 of a platform or stool (not shown). However, the same elevated height would also ensure that the work area 42 and any components present therein are hidden from sight by passengers of the aircraft 10.

Figure 7B:
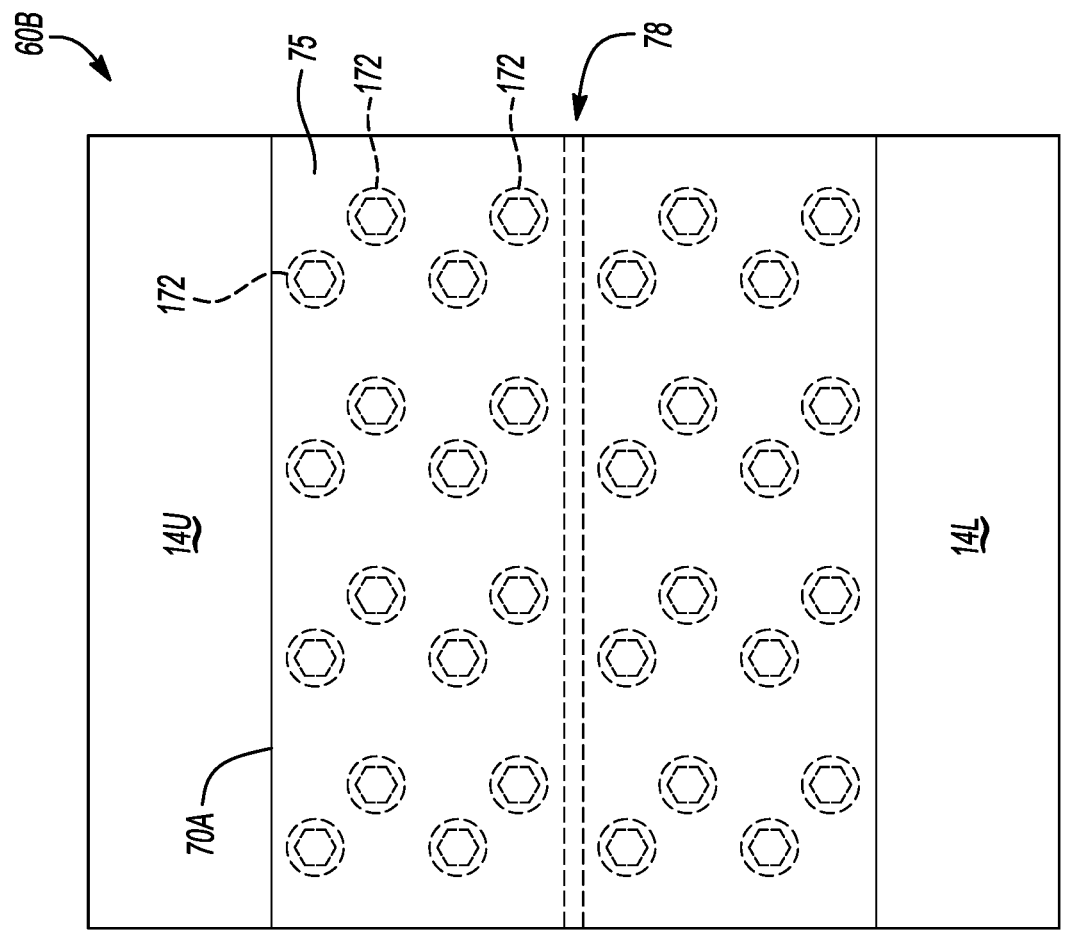
FIGS. 7A and 7B are respective side and plan view illustrations of a mating section of the bulkhead assembly describing one possible approach for joining the upper and lower bulkhead panels.
Figure 7A:
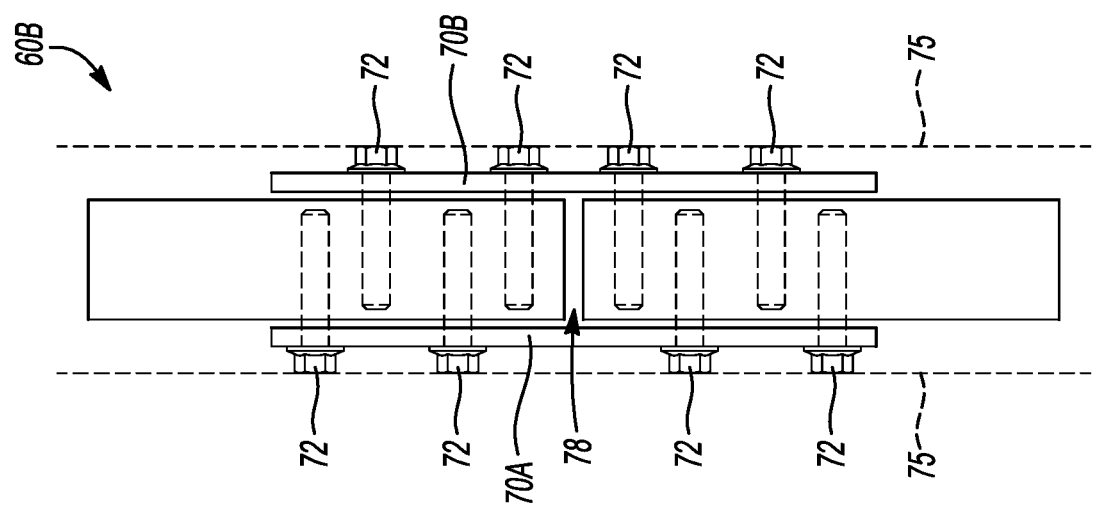

Referring to FIGS. 7A and 7B, the bulkhead coupling member 60 shown schematically in FIG. 4 may be embodied as a bulkhead coupling member 60B that includes a pair of splice plates 70A and 70B and a plurality of fasteners 72, e.g., rivets, bolts, or other suitable fastening components. The upper and lower bulkhead panels 14U and 14L in such an embodiment may be joined together via the pair of splice plates 70A and 70B and the plurality of fasteners 72. Approaches such as countersinking may be used to help blend or level the fasteners 72 with the splice plates 70A and 70B.

Alternatively, one may employ decorative trim panels 75 that are operatively connected to the respective upper and lower bulkhead panels 14U and 14L in a position that covers the splice plates 70A and 70B and fasteners 72. For instance, a resilient polymer adhesive panel may be applied over the fasteners 72 and the splice plates 70A and 70B, with the resiliency or flexibility of such a panel, possibly aided by small cut outs or pockets (not shown), allowing exposed heads of the fasteners 72 to be fully covered by the trim panels 75, thereby effectively hiding all outward traces of the fasteners 72 and a horizontal split line 78 between the upper and lower bulkhead panels 14U and 14L. The hidden nature of the fasteners 72 is shown in FIG. 7B as fasteners 172.

Figure 8:
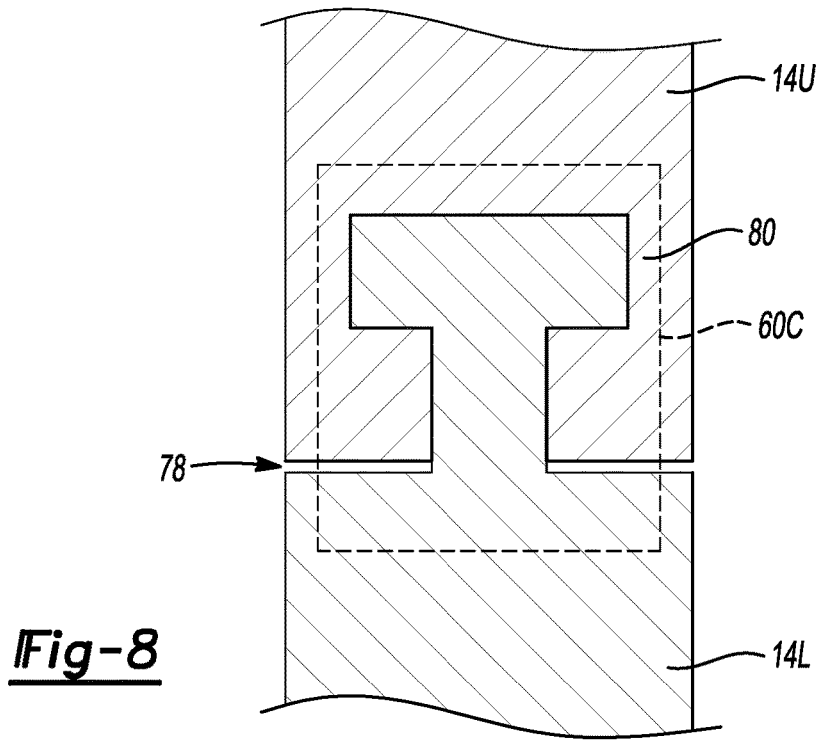
FIGS. 8 and 9 are respective side view and perspective view illustrations of an alternative approach to joining the upper and lower bulkhead panels in accordance with the present disclosure.

FIG. 8 presents yet another alternative for connecting the upper and lower bulkhead panels 14U and 14L. In this exemplary construction, a bulkhead coupling member 60C includes an elongated groove 80 and a mating tongue 82, such that the upper bulkhead panel 14U and the lower bulkhead panel 14L are interconnected via a tongue-and-groove connection as shown. Although the upper bulkhead panel 14U is depicted as defining the elongated groove 80 in FIG. 8, the opposite construction may be used within the scope of the disclosure, i.e., the elongated groove 80 may be defined by the lower bulkhead panel 14L, in which case the upper bulkhead panel 14U would include the mating tongue 82. Likewise, the T-shaped cross-section of the mating tongue 82 is just one possible construction, with various alternative mating shapes being suitable for achieving a secure tongue-and-groove engagement between the respective upper and lower bulkhead panels 14U and 14L, as appreciated in the art, e.g., tab and slot, dovetail, etc.

Figure 9:
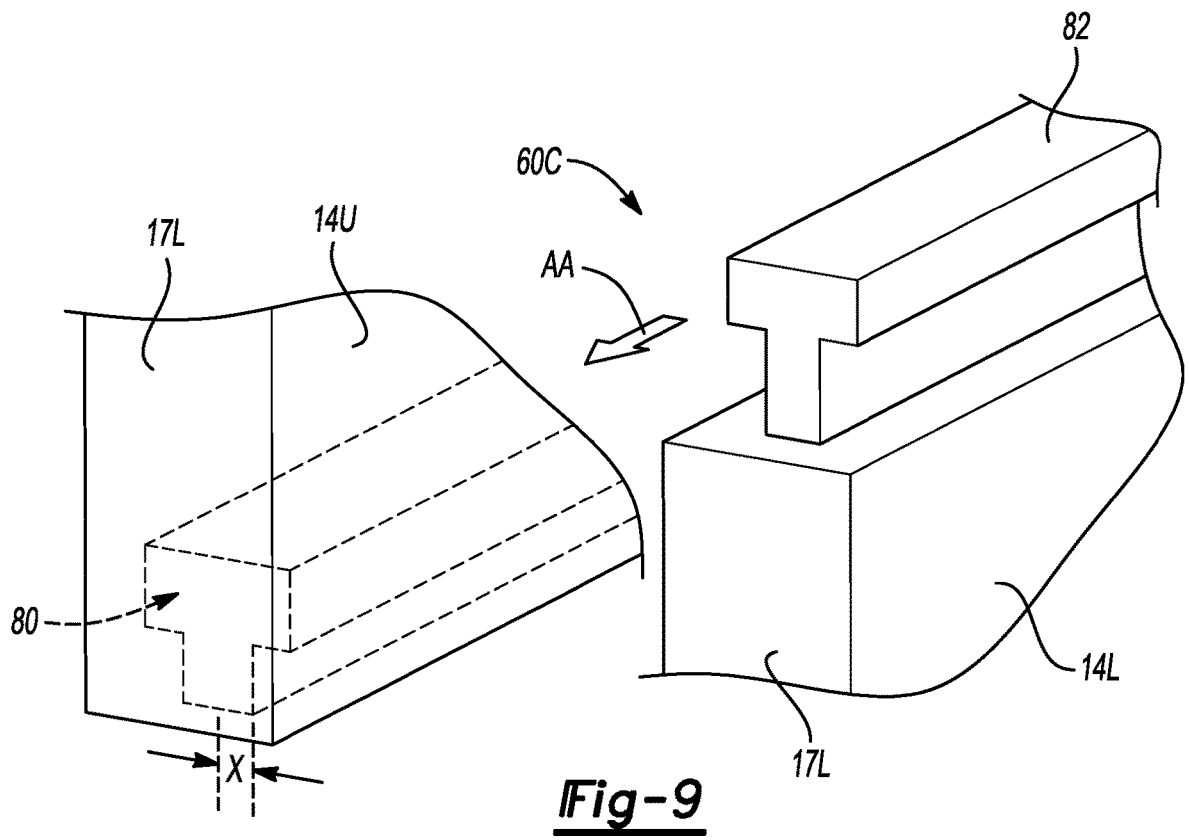

Referring to FIG. 9, which corresponds to FIG. 8, by using the tongue-and-groove option, the upper bulkhead panel 14U is able to slide onto the lower bulkhead panel 14L in an inboard-to-outboard motion, as indicated by arrow AA. In a possible implementation, the elongated groove 80 may stop short of a lateral edge 17L of the upper bulkhead panel 14U, i.e., by a standoff distance X. Such a construction would hide the attachment, with a simple set screw (not shown) possibly added to prevent separation of the upper and lower bulkhead panels 14U and 14L. If needed, the horizontal split line 78 between the adjoining upper and lower bulkhead panels 14U and 14L may be hidden by a trim or décor panel, e.g., the trim panels 75 of FIG. 7A. In the contemplated embodiments, the upper and lower bulkhead panels 14U and 14L are thus connected to each other in a manner that ultimately ensures loads are transferred to the secondary support member 28 of FIG. 4.

As will be appreciated by those skilled in the art in view of the foregoing disclosure, the described multi-piece structure of the bulkhead assembly 14 lends itself to a method for installing the bulkhead assembly 14 in the aircraft interior 12 of an aircraft, e.g., within the representative passenger cabin 110 of FIG. 2. Such a passenger cabin 110 includes the overhead closeout panel 20 and the secondary support member 28 as best shown in FIGS. 4 and 5.

With reference to the structure shown in FIGS. 4, 4A, and 5, the method according to an exemplary embodiment, in any suitable order or process sequence, includes inserting the terminal end 145 of the tower 45 of the upper bulkhead panel 14U through the slot opening 15 formed in the overhead closeout panel 20, such that the terminal end 145 protrudes through the slot opening 15. As described above and depicted in FIG. 4A, the upper bulkhead panel 14U includes the base 33, with the tower 45 tapering into the base 33 such that the width W33 of the base 33 is more than twice a width W45 of the tower 45. The method in this embodiment also includes connecting the terminal end 145 of the tower 45 to the secondary support member 28 behind the overhead closeout panel 20. Such an orientation is best shown in FIG. 6.

The method also includes joining the lower bulkhead panel 14L to the base 33 of the upper bulkhead panel 14U using the bulkhead coupling member 60, with this action likely but not necessarily occurring before connecting the upper bulkhead panel 14U to the secondary support member 28 to improve assembly efficiency. The lower bulkhead panel 14L is connected to the floor 22 (see FIGS. 1 and 2) of the passenger cabin 110.

As described above, the terminal end 145 of the tower 45 may include the parallel end plates 56 defining the groove 58 therebetween, as best shown in FIG. 5. Therefore, connecting the terminal end 145 of the tower 45 of the upper bulkhead panel 14U to the secondary support member 28 may include positioning the distal end 148 of the tie rod 48 within the groove 58, and thereafter connecting the distal end 148 to the terminal end through the parallel end plates 56.

The lower bulkhead panel 14L may optionally define the pocket 65 shown in FIG. 4A, in which case joining the lower bulkhead panel 14L to the base 33 of the upper bulkhead panel 14U includes positioning the base 33 at least partially within the optional pocket 65. Alternatively, joining the lower bulkhead panel 14L to the base 33 may include sliding the mating tongue 82 of the lower bulkhead panel 14L, as shown in FIGS. 8 and 9, into the elongated groove 80 of the upper bulkhead panel 14U to interconnect the respective upper and lower bulkhead panels 14U and 14L via a tongue-and-groove connection. As yet another alternative, joining the lower bulkhead panel 14L to the base 33 of the upper bulkhead panel 14U may include joining the lower bulkhead panel 14L to the upper bulkhead panel 14U via the optional pair of splice plates 70A and 70B of FIGS. 7A and 7B, with this particular action being accomplished using the fasteners 72.

In any or all of the described embodiments, the described method may include attaching the trim panels 75 to the upper and lower bulkhead panels 14U and 14L to cover the splice plates 70A and 70B and fasteners 72 of FIGS. 7A and 7B. When the bulkhead assembly 14 is constructed in this manner and used as part of a passenger suite, e.g., the high-walled cabin suite 120 of FIG. 1, the method may ultimately include engaging the lateral edge 17L of the lower bulkhead panel 14L with the doorframe 24 to form a wall of such a high-walled cabin suite 120.

As will be appreciated by those skilled in the art, the various solutions described herein allow for the construction of high suite walls to create fully enclosed suite compartments, such as the high-walled cabin suite 120 of FIG. 1. In lieu of using a full-height bulkhead and the required splitting of the overhead closeout panel 20 and routing of PSU hardware to accommodate intrusion of such a full-height bulkhead, the present construction instead employs a multi-piece bulkhead construction in which the upper bulkhead panel 14U is configured to penetrate through the overhead stow bins or blanking covers, i.e., as unobtrusively as possible through the slot opening 15, and thereafter directly or indirectly attach to the secondary support member 28.

Before this has occurred, the lower bulkhead panel 14L may be connected to the upper bulkhead panel 14L using the various options described above. The terminal end 145 of the tower 45 is inserted through the slot opening 15 and thereafter guided around existing support structure, PSU components, and wiring. The solutions described herein therefore thus do not require structural modifications beyond use of the slot opening 15 and the clevis opening 51 of FIG. 5. These and other benefits will be readily appreciated by those skilled in the art in view of the forgoing disclosure.

The following Clauses provide example configurations of the bulkhead assembly 14 and method disclosed herein.

Clause 1. A bulkhead assembly for a passenger cabin of an aircraft having a floor and a secondary support member, the bulkhead assembly comprising: an upper bulkhead panel defining an elongated tower portion, wherein the elongated tower portion is configured to protrude through a slot opening in an overhead closeout panel of the passenger cabin and directly or indirectly connect to the secondary support member; a lower bulkhead panel configured to connect to the upper bulkhead panel and to the floor of the passenger cabin to thereby form the bulkhead assembly; and a bulkhead coupling member configured to connect the upper bulkhead panel to the lower bulkhead panel.

Clause 2. The bulkhead assembly in accordance with Clause 1, wherein the bulkhead coupling member includes an elongated groove and a mating tongue, such that the upper bulkhead panel and the lower bulkhead panel are interconnected via a tongue-and-groove connection.

Clause 3. The bulkhead assembly of either of Clauses 1 or 2, wherein the bulkhead coupling member includes a pair of splice plates and a plurality of fasteners, and wherein the upper bulkhead panel and the lower bulkhead panel are joined together via the pair of splice plates and the plurality of fasteners.

Clause 4. The bulkhead assembly of Clause 3, further comprising a trim panel operatively connected to the upper bulkhead panel and the lower bulkhead panel and configured to cover the pair of splice plates and the plurality of fasteners.

Clause 5. The bulkhead assembly of any of Clauses 1-4, further comprising a tie rod configured to connect the elongated tower portion to the secondary support member.

Clause 6. The bulkhead assembly of Clause 5, wherein the elongated tower portion includes a terminal end configured to engage with a distal end of the tie rod.

Clause 7. The bulkhead assembly of Clause 6, wherein the terminal end of the elongated tower portion includes parallel mounting plates defining a groove therebetween, and wherein the groove is configured to receive the distal end of the tie rod therein.

Clause 8. The bulkhead assembly of any of Clauses 1-7, wherein the lower bulkhead panel defines a pocket, and wherein the upper bulkhead panel is positioned at least partially within the pocket of the lower bulkhead panel.

Clause 9. The bulkhead assembly of any of Clauses 1-8, wherein a width of the elongated tower portion is less than half of a width of a base of the upper bulkhead panel.

Clause 10. The bulkhead assembly of any of Clauses 1-9, wherein a perimeter edge of the upper bulkhead panel is contoured to match a surface profile of the overhead closeout panel.

Clause 11. The bulkhead assembly of any of Clauses 1-10, wherein the passenger cabin includes adjacent cabin suites, and wherein the bulkhead assembly is configured to separate the adjacent cabin suites from each other as a shared bulkhead.

Clause 12. A method for installing a bulkhead assembly in a passenger cabin of an aircraft, the passenger cabin having a floor, an overhead closeout panel, and a secondary support member, the method comprising: connecting a lower bulkhead panel to the floor of the passenger cabin; inserting a terminal end of an elongated tower portion of an upper bulkhead panel through an opening in the overhead closeout panel, such that the terminal end of the elongated tower portion protrudes through the opening, wherein the upper bulkhead panel has a base that tapers into the elongated tower portion, and such that a width of the base is more than twice a width of the elongated tower portion; connecting the terminal end of the elongated tower portion to the secondary support member behind the overhead closeout panel; joining a lower bulkhead panel to the base of the upper bulkhead panel using a bulkhead coupling member to thereby form the bulkhead assembly.

Clause 13. The method of Clause 12, wherein the terminal end of the elongated tower portion comprises parallel end plates defining a groove therebetween, and wherein connecting the terminal end of the elongated tower portion of the upper bulkhead panel to the secondary support member includes positioning a distal end of a tie rod within the groove and thereafter connecting the distal end of the tie rod to the terminal end of the upper bulkhead panel through the parallel end plates.

Clause 14. The method of either of Clauses 12 or 13, wherein the lower bulkhead panel defines a pocket, and wherein joining the lower bulkhead panel to the base of the upper bulkhead panel includes positioning the base of the upper bulkhead panel at least partially within the pocket.

Clause 15. The method of any of Clauses 12-14, wherein joining the lower bulkhead panel to the base includes sliding a mating tongue of the lower bulkhead panel into an elongated groove of the upper bulkhead panel to interconnect the upper bulkhead panel and the lower bulkhead panel via a tongue-and-groove connection, and wherein the bulkhead coupling member includes the mating tongue and the elongated groove.

Clause 16. The method of any of Clauses 12-15, wherein joining the lower bulkhead panel to the base of the upper bulkhead panel includes joining the lower bulkhead panel to the upper bulkhead panel via a pair of splice plates using a plurality of fasteners, and wherein the bulkhead coupling member includes the pair of splice plates and the plurality of fasteners.

Clause 17. The method of any of Clauses 12-16, further comprising attaching a trim panel to the upper bulkhead panel and the lower bulkhead panel to cover the pair of splice plates and the plurality of fasteners.

Clause 18. The method of any of Clauses 12-17, further comprising engaging a lateral edge of the lower bulkhead panel with a doorframe within the passenger cabin to form a wall of a cabin suite.

Clause 19. A cabin suite for a cabin of an aircraft, the aircraft having an overhead closeout panel connected to a secondary support member, the cabin suite comprising: a floor; a doorframe connected to the floor; a door connected to the doorframe; and a bulkhead assembly connected to the secondary support member and to the floor, the bulkhead assembly comprising: a tie rod; an upper bulkhead panel having a base and an elongated tower portion, wherein the base tapers into the tower portion, a perimeter edge of the upper bulkhead panel is contoured to match a profile of the overhead closeout panel, and a terminal end of the elongated tower portion protrudes through an opening in the overhead closeout panel and connects to the secondary support member via the tie rod, and wherein a width of the elongated tower portion is less than half of a width of the base; a bulkhead coupling member; and a lower bulkhead panel connected to the floor, and to the upper bulkhead panel via the bulkhead coupling member.

Clause 20: The cabin suite of Clause 19, wherein the bulkhead coupling member includes a pair of splice plates, a plurality of fasteners, and a trim panel operatively connected to the upper bulkhead panel and the lower bulkhead panel to cover the pair of splice plates and the plurality of fasteners.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A bulkhead assembly for a passenger cabin of an aircraft having a floor and a secondary support member, the bulkhead assembly comprising:
    an upper bulkhead panel having a tower portion and a base portion, wherein the tower portion narrows as the tower portion extends away from the base portion such that the base portion is wider than the tower portion;
    wherein the tower portion is configured to protrude through a slot opening in an overhead closeout panel of the passenger cabin and directly or indirectly connect to the secondary support member;
    a lower bulkhead panel configured to connect to the floor of the passenger cabin, wherein the upper bulkhead panel is separable from the lower bulkhead panel;
    wherein the lower bulkhead panel defines a pocket, and the base portion of the upper bulkhead panel is disposed inside of the pocket to connect the upper bulkhead panel to the lower bulkhead panel to form the bulkhead assembly, and the tower portion of the upper bulkhead panel extend outwardly away from the pocket;
    wherein a gap is formed between a side wall and a ceiling of the passenger cabin to provide access to a work area behind the overhead closeout panel to connect the tower portion to a tie rod within the work area; and
    wherein the tie rod is disposed between the overhead closeout panel and the side wall within the work area, and a clevis fastener protrudes through a clevis opening of a strong back into the work area to connect the tie rod to the clevis fastener.

2. The bulkhead assembly of claim 1, wherein a width of the tower portion is less than half of a width of the base portion of the upper bulkhead panel such that the base portion is wider than the tower portion.

3. The bulkhead assembly of claim 1, wherein a perimeter edge of the upper bulkhead panel is contoured to match a surface profile of the overhead closeout panel.

4. The bulkhead assembly of claim 1, wherein the tower portion is directly or indirectly connected to the secondary support member to transfer loads to the secondary support member.

5. The bulkhead assembly of claim 1, wherein the passenger cabin includes adjacent cabin suites, and wherein the bulkhead assembly is configured to separate the adjacent cabin suites from each other as a shared bulkhead.

6. A bulkhead assembly for a passenger cabin of an aircraft including a support beam having an overhead closeout panel mounted thereto and including a floor, the bulkhead assembly comprising:
    an upper bulkhead panel having a tower portion and a base portion, wherein the tower portion narrows as the tower portion extends away from the base portion such that the base portion is wider than the tower portion;
    a tie rod connected to a terminal end of the tower portion and connected to the support beam via a clevis fastener;
    a lower bulkhead panel configured to connect to the floor of the passenger cabin;
    a bulkhead coupling member configured to connect the upper bulkhead panel to the lower bulkhead panel to thereby form the bulkhead assembly;
    wherein the tower portion is configured to protrude through a slot opening in the overhead closeout panel and is connect to the support beam via the tie rod to transfer loads from the bulkhead assembly to the support beam;
    wherein a gap is formed between a side wall and a ceiling of the passenger cabin to provide access to a work area behind the overhead closeout panel to connect the tower portion to the tie rod within the work area; and
    wherein the tie rod is disposed between the overhead closeout panel and the side wall within the work area, and the clevis fastener protrudes through a clevis opening of a strong back into the work area to connect the tie rod to the clevis fastener.

7. The bulkhead assembly of claim 6, wherein the bulkhead coupling member includes an elongated groove and a mating tongue, such that the upper bulkhead panel and the lower bulkhead panel are interconnected via a tongue-and-groove connection.

8. The bulkhead assembly of claim 6, wherein the bulkhead coupling member includes a pair of splice plates and a plurality of fasteners, wherein the upper bulkhead panel and the lower bulkhead panel are joined together via the pair of splice plates and the plurality of fasteners.

9. The bulkhead assembly of claim 8, further comprising a trim panel operatively connected to the upper bulkhead panel and the lower bulkhead panel and configured to cover the pair of splice plates and the plurality of fasteners.

10. The bulkhead assembly of claim 6, wherein the terminal end of the tower portion is connected to a distal end of the tie rod within the work area.

11. The bulkhead assembly of claim 10, wherein the terminal end of the tower portion includes parallel mounting plates defining a groove therebetween, and wherein the groove is configured to receive the distal end of the tie rod therein.

12. The bulkhead assembly of claim 6, wherein the lower bulkhead panel defines a pocket, and wherein the upper bulkhead panel is separable from the lower bulkhead panel and is positioned at least partially within the pocket of the lower bulkhead panel.

13. The bulkhead assembly of claim 6, wherein the passenger cabin includes adjacent cabin suites, and wherein the bulkhead assembly is configured to separate the adjacent cabin suites from each other as a shared bulkhead.

14. The bulkhead assembly of claim 6, wherein a width of the tower portion is less than half of a width of the base portion of the upper bulkhead panel such that the base portion is wider than the tower portion.

15. A method for installing a bulkhead assembly in a passenger cabin of an aircraft, the passenger cabin having a floor, an overhead closeout panel, and a secondary support member, the method comprising:
connecting a lower bulkhead panel to the floor of the passenger cabin;
joining the lower bulkhead panel to a base portion of an upper bulkhead panel using a bulkhead coupling member to connect the upper bulkhead panel to the lower bulkhead panel to thereby form the bulkhead assembly;
inserting a terminal end of a tower portion of the upper bulkhead panel through a slot opening in the overhead closeout panel, such that the terminal end of the tower portion protrudes through the slot opening, wherein the tower portion narrows as the tower portion extends away from the base portion such that a width of the base portion is more than twice a width of the tower portion; and
connecting the terminal end of the tower portion to the secondary support member via a tie rod behind the overhead closeout panel accessible via a work area through a gap between a side wall and a ceiling of the passenger cabin, such that the upper bulkhead panel is suspended from the secondary support member and loads are transferred from the bulkhead assembly to the secondary support member, wherein the tie rod is disposed between the overhead closeout panel and the side wall within the work area, and a clevis fastener protrudes through a clevis opening of a strong back into the work area to connect the tie rod to the clevis fastener.

16. The method of claim 15, wherein the terminal end of the tower portion comprises parallel end plates defining a groove therebetween, and wherein connecting the terminal end of the tower portion of the upper bulkhead panel to the secondary support member includes positioning a distal end of the tie rod within the groove and thereafter connecting the distal end of the tie rod to the terminal end of the upper bulkhead panel through the parallel end plates.

17. The method of claim 15, wherein the lower bulkhead panel defines a pocket, and wherein joining the lower bulkhead panel to the base portion of the upper bulkhead panel includes positioning the base portion of the upper bulkhead panel at least partially within the pocket.

18. The method of claim 15, wherein joining the lower bulkhead panel to the base portion includes sliding a mating tongue of the lower bulkhead panel into an elongated groove of the upper bulkhead panel to interconnect the upper bulkhead panel and the lower bulkhead panel via a tongue-and-groove connection, and wherein the bulkhead coupling member includes the mating tongue and the elongated groove.

19. The method of claim 15, wherein joining the lower bulkhead panel to the base portion of the upper bulkhead panel includes joining the lower bulkhead panel to the upper bulkhead panel via a pair of splice plates using a plurality of fasteners, and wherein the bulkhead coupling member includes the pair of splice plates and the plurality of fasteners.

20. The method of claim 19, further comprising attaching a trim panel to the upper bulkhead panel and the lower bulkhead panel to cover the pair of splice plates and the plurality of fasteners.

21. The method of claim 15, further comprising engaging a lateral edge of the lower bulkhead panel with a doorframe within the passenger cabin to form a wall of a cabin suite.

* * * * *